United States Patent
Komatsu et al.

(10) Patent No.: US 6,379,443 B1
(45) Date of Patent: Apr. 30, 2002

(54) INK JET RECORDING METHOD AND INK COMPOSITION FOR USE IN SAID METHOD

(75) Inventors: Hidehiko Komatsu; Hiroto Nakamura, both of Nagano-Ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/521,573

(22) Filed: Mar. 9, 2000

(30) Foreign Application Priority Data

Mar. 12, 1999 (JP) .......................................... 11-067159

(51) Int. Cl.⁷ .............................................. C09D 11/00
(52) U.S. Cl. ................................ 106/31.58; 106/31.86; 106/31.59; 106/31.89
(58) Field of Search ........................ 106/31.58, 31.86, 106/31.59, 31.89

(56) References Cited

U.S. PATENT DOCUMENTS

| | | |
|---|---|---|
| 5,428,384 A | 6/1995 | Richtsmeier et al. ........ 347/102 |
| 5,479,199 A | 12/1995 | Moore et al. ................ 347/102 |
| 5,879,439 A * | 3/1999 | Nagai et al. ................. 106/31.28 |
| 5,976,233 A * | 11/1999 | Osumi et al. ................ 106/31.86 |
| 6,051,057 A * | 4/2000 | Yatake et al. ................ 106/31.58 |

FOREIGN PATENT DOCUMENTS

| | | | |
|---|---|---|---|
| EP | 0583096 | 2/1994 | |
| EP | 0767225 | 4/1997 | |
| JP | 62(1987)-288042 | 12/1987 | ............ B41J/3/04 |
| JP | 05(1993)-330032 | 12/1993 | ............ B41J/2/01 |
| JP | 08(1996)-333534 | 12/1996 | ............ C09D/11/00 |
| JP | 10(1998)-237371 | 9/1998 | ............ C09D/11/00 |

OTHER PUBLICATIONS

JPO Abstract 62(1987)–288042, Dec. 14, 1987.
JPO Abstract 05(1993)–330032, Dec. 14, 1993.
JPO Abstract 08(1996)–333534, Dec. 17, 1996.
JPO Abstract 10(1998)–237371, Sep. 8, 1998.

* cited by examiner

Primary Examiner—C. Melissa Koslow
Assistant Examiner—Veronica F. Faison
(74) Attorney, Agent, or Firm—Ladas & Parry

(57) ABSTRACT

Disclosed is an ink jet recording method which can efficiently realize good images, particularly an ink jet recording method which can realize, on plain papers, high-quality prints free from feathering or color-to-color mixing at a relatively low heating temperature, and an ink composition for use in this method.

An ink composition comprising at least a colorant, a water-soluble organic solvent, water, and at least one compound represented by formula (I) is printed on a recording medium heated at a temperature of or above the cloud point of the compound represented by formula (I):

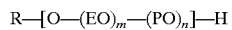

$$R-[O-(EO)_m-(PO)_n]_k-H$$

wherein EO represents an ethyleneoxy group; PO represents a propyleneoxy group; m and n are each an integer; k is a natural number of 1 or more; and R represents $C_kH_{2k-1}$ wherein k is a natural number of 4 to 18, EO and PO being arranged, regardless of order in the parentheses, randomly or as blocks joined together.

30 Claims, 1 Drawing Sheet

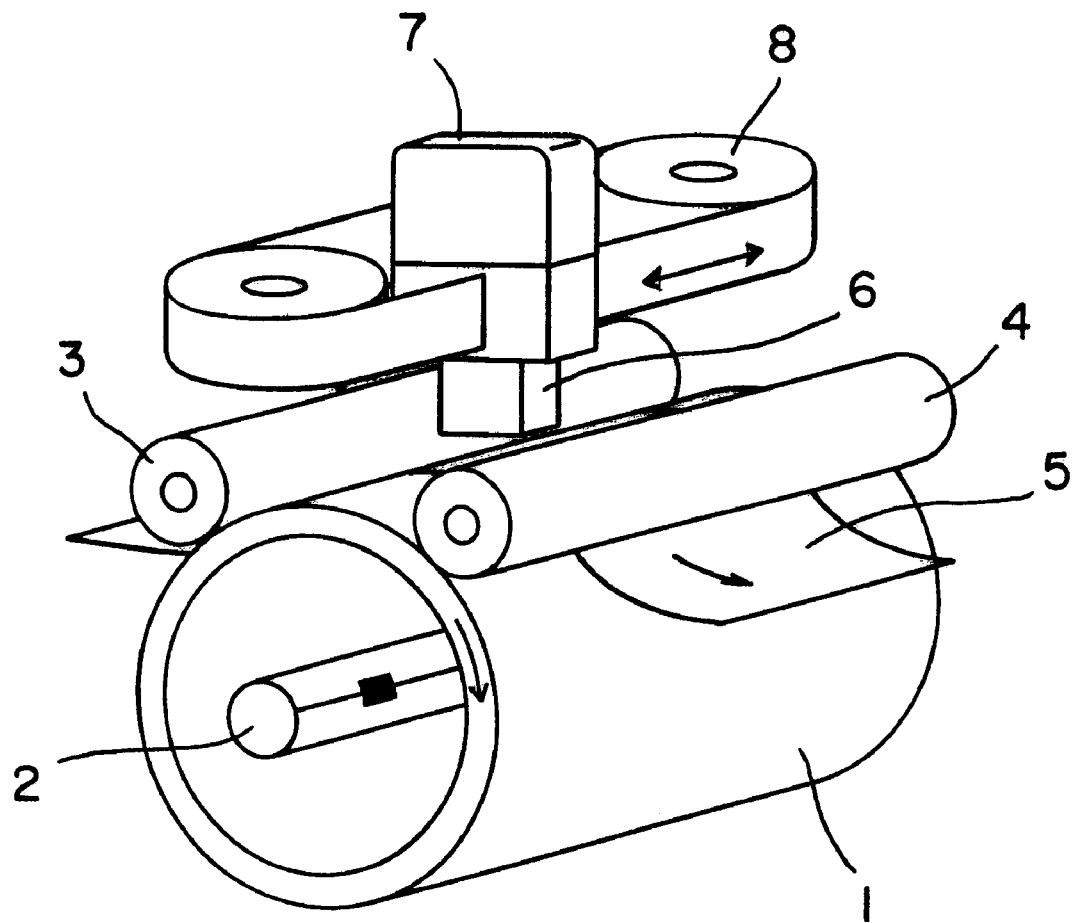
F I G. 1

INK JET RECORDING METHOD AND INK COMPOSITION FOR USE IN SAID METHOD

BACKGROUND OF THE INVENTION

1. Field of the Invention

The present invention relates to an ink composition for ink jet recording and an ink jet recording method wherein ink droplets are ejected from a recording head to yield an ink image on a recording medium.

2. Background Art

Ink jet recording is a printing method wherein droplets of an ink composition are ejected and deposited onto a recording medium, such as paper, to conduct printing. This method has a feature that an image having high resolution and high quality can be printed at a high speed by means of relatively inexpensive apparatuses. In general, the ink composition used in the ink jet recording comprises water as a main component and, added thereto, a colorant and a wetting agent, such as glycerin, for preventing clogging and other purposes.

One of the problems to be solved in the ink jet recording method is feathering. Further, for example, good rapidity in drying of prints, good printing on various recording media, and, in the case of multi-color printing, freedom from bleeding of the ink from color to adjacent colors are required of inks for ink jet recording.

Various methods have been proposed in order to realize good images free from feathering or bleeding. For example, Japanese Patent Laid-Open Nos. 288042/1987, 330032/1993, and 126952/1994 disclose ink jet recording methods wherein a recording medium is heated during or immediately before printing.

In these methods, the recording medium is heated to evaporate the solvent component in dots on the recording medium by heat energy to reduce feathering of the ink and, at the same time, to improve the fixation of printed images.

The heating of the recording medium, however, has a fear of causing a failure of the ink jet head close to the recording medium to eject the ink, heat distortion of the recording medium and the like. Therefore, measures should be taken to avoid these unfavorable phenomena. Further, there is an ever-increasing demand for an increase in printing speed and an increase in quality. In addition, an ink jet recording method, with higher efficiency, involving heating of the recording medium has been still desired in the art from the viewpoint of energy saving.

SUMMARY OF THE INVENTION

The present inventors have now found that a combination of an ink composition containing a certain compound with an ink jet recording method, wherein a recording medium is heated at a temperature of or above the cloud point of the compound, can realize very good images with high efficiency. The present invention has been made based on such finding.

Accordingly, it is an object of the present invention to provide an ink jet recording method which can efficiently realize good images, particularly an ink jet recording method which can realize, on plain papers, high-quality prints free from feathering or bleeding at a relatively low heating temperature, and an ink composition for use in this method.

According to one aspect of the present invention, there is provided an ink composition for an ink jet recording method comprising the step of ejecting droplets of an ink composition and depositing the droplets onto a heated recording medium, the ink composition comprising at least a colorant, a water-soluble organic solvent, water, and at least one compound represented by formula (I), the colorant being present in the state of dispersion in the ink composition, the surface of the heated recording medium having a temperature of or above the cloud point of the compound represented by formula (I):

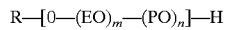

$$R-[O-(EO)_m-(PO)_n]-H$$

wherein
EO represents an ethyleneoxy group;
PO represents a propyleneoxy group;
m and n are each an integer; and
R represents $C_KH_{2k+1}$ wherein k is a natural number of 4 to 18,
EO and PO being arranged, regardless of order in the parentheses, randomly or as blocks joined together.

BRIEF DESCRIPTION OF THE DRAWING

FIG. 1 is a diagram showing the basic construction of an ink jet recording apparatus which may be preferably used in the printing of the ink composition according to the present invention.

DESCRIPTION OF THE PREFERRED EMBODIMENTS

DEFINITION

The ink for ink jet recording according to the present invention refers to a black ink in the case of monochrome printing and color inks in the case of color printing, specifically yellow, magenta, cyan inks, a green ink, a brown ink, and an orange ink, and optionally a black ink.

According to the present invention, the cloud point of the compound represented by formula (I) refers to a temperature such that, when an aqueous solution of the compound of formula (I), of which the concentration of the compound of formula (I) is the same as the concentration of the compound of formula (I) in the ink composition, is provided and then heated, renders the solution opaque as a result of a lowering in the solubility of the compound of formula (I) in water. Further, in particular, when reference is made to the cloud point of a specific mixture of compounds represented by formula (I), the cloud point refers to the cloud point of an aqueous solution of the mixture of compounds represented by formula (I), of which the concentration of the compound represented by formula (I) is the same as the concentration of the mixture in the ink composition.

Compound Represented by Formula (I)

The ink for ink jet recording according to the present invention contains at least one compound represented by formula (I).

In the formula (I), PO represents ethyleneoxy, that is, $-CH_2CH_2O-$, and PO represents propyleneoxy, that is, $-CH_2CH_2CH_2O-$ or $-CH(CH_3)CH_2O-$. EO and PO may be arranged in the molecule of the compound represented by formula (I) (that is, in parentheses in formula (I)) in any order and may be arranged randomly or as blocks joined together.

The $C_kH_{2k+1}$ group represented by R in formula (I) may be of branched or straight-chain type. In this case, k is a natural number of 4 to 18. Therefore, R represents a $C_{4-18}$ alkyl group. Specific examples thereof include butyl, pentyl, hexyl, heptyl, octyl, nonyl, and decyl groups. The alkyl group having 4 to 18 carbon atoms, preferably 4 to 10 carbon atoms, can provide an ink composition having good penetrability. As described above, the alkyl group may be of branched or straight-chain type. In general, however, the branched type is preferred. For example, in the case of a butyl group, the utilization of a compound with R representing a branched butyl group, that is, an isobutyl or t-butyl group, as a main component can provide an ink composition having good penetrability which can yield high-quality images. According to the present invention, the compounds represented by formula (I) may be used as a mixture of two or more.

According to the present invention, n and m represent respective values for each molecule in the compounds represented by formula (I) contained in the ink composition. When otherwise specified, n and m are sometimes expressed in terms of the average value for a mixture of compounds represented by formula (I) contained in the ink composition.

The compound represented by formula (I) may be prepared by providing an alcohol having a corresponding structure as a starting compound and adding a predetermined molar amount of ethylene oxide or propylene oxide to the starting compound in an atmosphere of an alkali or the like. A mixture of two or more compounds represented by formula (I) is generally obtained by the above method.

According to a preferred embodiment of the present invention, the ink composition contains a plurality of compounds represented by formula (I) which are classified into a first group of compounds and a second group of compounds. The first group of compounds satisfy a relationship wherein k=6 to 18 (preferably 8 to 16) and $2/3 \leq m/n \leq 1.5$ (preferably $0.8 \leq m/n \leq 1.25$), and having an average molecular weight of 1,000 to 8,000 (preferably 1,500 to 7,000). The second group of compounds satisfy a relationship wherein k=4 to 10, m=1 to 10, n 1 to 5, and $1.5 \leq m/n$. A mixture of these two groups of compounds can lower the cloud point. Consequently, the heating temperature of the recording medium can be brought to a relatively low temperature. Heating even at the relatively low temperature can realize good images having no significant feathering or no significant bleeding of the ink from color to color. According to experiments conducted by the present inventors, for a large number of water-base ink compositions, heating at the boiling temperature of water (100° C.) or above was necessary to yield good images free from feathering or bleeding. According to a preferred embodiment of the present invention, however, the heating temperature of the recording medium can be brought to a temperature below the boiling temperature of water. Good images having no significant feathering or bleeding is considered realizable through the following mechanism. However, it should be noted that the following mechanism is merely hypothetical and does not limit the present invention. The first group of compounds can accelerate the separation between the solvent and the colorant in the ink composition at a temperature of or above the cloud point to suppress feathering. On the other hand, the second group of compounds can accelerate the penetration of the solvent in the ink composition to prevent the bleeding of the ink from color to color. That is, these two groups of compounds have the effect of improving the penetration of the ink composition and the effect of separating the colorant from the solvent in the ink composition. Although it is difficult to say that these two effects are attained by only one of the first group of compounds and the second group of compounds, there is a tendency that the effect of separating the dispersion medium from the colorant increases with increasing the molecular weight of the first group of compounds.

When a surfactant is added to an ink composition from the viewpoint of improving the penetration of the ink composition into the recording medium, the surfactant sometimes inhibits the above function of the first group of compounds. The addition of the second group of compounds is also advantageous in that this adverse effect of the surfactant can be prevented. An additional advantage is such that, when the second group of compounds have low solubility in water at room temperature, the first group of compounds can accelerate the dissolution of the second group of compounds in the ink composition.

According to a preferred embodiment of the present invention, at least one of the first group of compounds and the second group of compounds preferably has a cloud point of room temperature to 100° C. (more preferably 40 to 70° C.) from the viewpoint of preventing feathering and bleeding of the ink from color to color. Further, the above temperature range is advantageous in that a failure of the ink to be supplied in the course of supply from the ink container to the recording head at room temperature or otherwise within the recording head is less likely to occur, the consumption energy can be kept low, printing can be stably carried out and a heat deterioration in members of the printer is less likely to occur.

The amounts of the first group of compounds and the second group of compounds added may be properly determined so that the above advantages can be provided. However, the content of the first group of compounds is preferably about 2 to 10% by weight based on the ink composition, and the content of the second group of compounds is preferably 0.5 to 5% by weight based on the ink composition.

Colorant

The colorant contained in the ink composition according to the present invention is present in the state of dispersion in the ink composition. Therefore, the colorant according to the present invention is not particularly limited so far as the colorant can be satisfactorily dispersed in an aqueous medium.

Specific examples of pigments include organic pigments and inorganic pigments.

For example, inorganic pigments for black include: carbon blacks (C. . Pigment Black 7), such as furnace black, lamp black, acetylene black, and channel black; and iron oxide pigments. Organic pigments for black include black organic pigments, such as aniline black (C.I. Pigment Black 1).

Pigments for yellow ink include C.I. Pigment Yellow 1 (Hanza Yellow), 3 (Hanza Yellow 10G), 12, 13, 14, 17, 24 (Flavanthrone Yellow), 34, 35, 37, 53, 55, 65, 73, 74, 81, 83, 93, 94, 95, 97, 98, 99, 108 (Anthrapyrimidine Yellow), 109, 110, 113, 117 (copper complex salt pigment), 120, 128, 133 (quinophthalone), 138, 139 (isoindolinone), 147, 151, 153 (nickel complex pigment), 154, 167, 172, and 180.

Pigments for magenta ink include: C.I. Pigment Red 1 (Para Red), 2, 3 (Toluidine Red), 5 (ITR Red), 7, 9, 10, 11, 12, 17, 30, 31, 38 (Pyrazolone Red), 42, 88 (thioindigo), 112 (Naphthol AS pigment), 114 (Naphthol AS pigment), 122 (dimethylquinacridone), 123, 144, 149, 150, 166, 168 (Anthanthrone Orange), 170 (Naphthol AS pigment), 171, 175, 176, 177, 178, 179 (Perylene Maroon), 185, 187, 209 (dichloroquinacridone), 219, 224 (perylene pigment), 245

(Naphthol As pigment); and C.I. Pigment Violet 19 (quinacridone), 23 (Dioxazine Violet), 32, 33, 36, 38, 43, and 50.

Pigments for cyan ink include C.I. Pigment Blue 15, 15:1, 15:2, 15:3:, 16 (metal-free phthalocyanine), 18 (Alkali Blue Toner), 25, 60 (Threne Blue), 65 (violanthrone), and 66 (indigo).

Organic pigments for color inks other than magenta, cyan, and yellow inks include:

C.I. Pigment Green 7 (Phthalocyanine Green), 10 (Green Gold), 36, and 37;

C.I. Pigment Brown 3, 5, 25, and 26; and

C.I. Pigment orange 1, 2, 5, 7, 13, 14, 15, 16, 34, 36, and 38. In addition, for example, modified pigments prepared by treating pigments with resin or the like, such as grafted carbons, may also be used. The above pigments may also be used in combination of two or more of them.

The amount of the colorant added to the ink composition may be properly determined. The amount of the colorant added, however, is preferably 0.5 to 30% by weight, more preferably 1.0 to 12% by weight. When the amount of the colorant falls within the above amount range, good print density can be ensured. Further, in this case, the viscosity of the ink composition can be brought to a suitable range such that can realize stable ejection.

The average particle diameter of the colorant is preferably not more than 25 µm, more preferably not more than 1 µm. The average particle diameter is more preferably not more than 0.3 µm from the viewpoint of Stability against sedimentation.

The pigment may be dispersed in an aqueous medium with the aid of a dispersant. Examples of dispersants usable herein include those wherein the molecular skeleton is constituted by a styrene/acrylic acid copolymer resin, the weight average molecular weight (hereinafter referred to simply as "molecular weight") is 1,600 to 25,000 and the acid value is 100 to 250. Specific examples of such dispersants include those manufactured by Johnson Polymer Corp., for example, Joncryl 68 (molecular weight 10,000, acid value 195), Joncryl 680 (molecular weight 3,900, acid value 215), Joncryl 682 (molecular weight 1,600, acid value 235), Joncryl 550 (molecular weight 7,500, acid value 200), Joncryl 555 (molecular weight 5,000, acid value 200), Joncryl 586 (molecular weight 3,100, acid value 105), Joncryl 683 (molecular weight 7,300, acid value 150), and s-36 (molecular weight 6,800, acid value 250).

In order to dissolve the resin dispersant, the formation of a salt thereof with acrylic acid is preferred. To this end, counter ions, for example, aminomethylpropanol, 2-aminoisopropanol, triethanolamine, morpholine, or aqueous ammonia may be added. The addition of the counter ion in an amount of at least the neutralization equivalent of the resin dispersant suffices for contemplated results. The amount of the counter ion added, however, is preferably about 1.3 times the neutralization equivalent from the viewpoint of the fixation after printing.

Further, in order to provide dissolution stability of the dispersant, pH buffer is preferably added to facilitate ion dissociation of the salt in the dispersant, thereby regulating the ink to an optimal pH value. Specific examples of pH buffers usable herein include potassium hydrogenphthalate, potassium dihydrogenphosphate, disodium hydrogenphosphate, sodium tetraborate, potassium hydrogentartrate, sodium hydrogencarbonate, sodium carbonate, tris(hydroxymethyl)aminomethane, and tris (hydroxymethyl)aminomethane hydrochloride. The amount of the pH buffer added may be properly determined. From the viewpoint of the durability of the head member and the stability of the ink, however, the amount of the pH buffer added is preferably such that the pH value of the ink composition is brought to about 7 to 10.

According to a preferred embodiment of the present invention, the colorant is a surface modified carbon black or organic pigment which has a functional group introduced on its surface and can be solely dispersed in an aqueous solvent. The use of this pigment can provide a stable ink composition. For example, the addition of the compound represented by formula (I) and, in addition, glycol ethers, such as (di)propylene glycol monobutyl ether or di(tri)ethylene glycol monobutyl ether, to an ink composition containing a colorant, which has been dispersed therein with the aid of a dispersant, sometimes renders the ink composition system unstable, often leading to coagulation. The surface modified pigment, however, even when the above component is added to the ink composition, can be stably dispersed in the ink composition. For example, when the ink composition is exposed to high temperatures during storage, coagulation is likely to occur. Specifically, the temperature is often raised to the cloud point of the compound represented by formula (I) or above, resulting in the formation of coagulate. By contrast, the ink composition using the surface modified pigment is advantageous in that the coagulate disappears upon the return of the temperature to room temperature.

Examples of methods for introducing functional groups into the surface of the pigment will be described. Liquid phase or gaseous phase oxidation with an oxidizing agent, such as ozone, nitric acid, hydrogen peroxide, hypohalous acid, nitrogen oxide, or fluorine gas, is preferred in the introduction of carboxyl or hydroxyl groups. Plasma treatment also can introduce these groups on the other hand, sulfonation with a sulfonating agent, such as sulfuric acid, fuming sulfuric acid, sulfonated pyridine-carboxylic acid, sulfamic acid, sulfur trioxide, chlorosulfuric acid, or amidosulfuric acid, may be used in the introduction of sulfur-containing functional groups including sulfinic acid group ($SO_2^-$) and sulfonic acid group ($SO_3^-$). These oxidizing agents and sulfonating agents may be used alone or as a mixture of two or more.

According to the present invention, the presence of functional groups for imparting dispersibility to the pigment at least on the surface of particles suffices for satisfactory results. The functional groups may also be contained within the particles.

According to a preferred embodiment of the present invention, functional groups, capable of imparting dispersibility to the pigment, introduced into the surface of pigment particles, include sulfur-containing functional groups. Specific examples thereof include sulfinic acid group ($SO_2^-$) and sulfonic acid group ($SO_3^-$). Carboxyl and hydroxyl groups are known as functional groups capable of imparting dispersibility to the pigment. In general, however, severe reaction conditions, such as oxidation, are required in order to introduce carboxyl and hydroxyl groups into the pigment on its surface. Therefore, an attempt to introduce these groups into organic pigments other than carbon black leads to a fear of the structure of the organic pigment contributing to color development to be disrupted. For this reason, the pigment, to which the dispersibility can be imparted by introducing these groups, has been practically limited to carbon black. By contrast, sulfur-containing functional groups, such as sulfinic acid group or sulfonic acid group, are dispersibility-imparting groups which can be introduced under relatively mild reaction conditions. Therefore, the utilization of the sulfur-containing functional groups can very advantageously broaden the range of pigments which can be solely dispersed in aqueous solvents.

Pigment particles having such sulfur-containing functional groups on the surface thereof may be prepared by conventional methods, and examples thereof include Japanese Patent Laid-open Nos. 283596/1996, 110110/1998, 110111/1998, and 110114/1998.

A preferred example of the method for preparing an aqueous dispersion containing pigment particles having sulfur-containing groups on the surface thereof will be described. At the outset, a particulate pigment is added to an aprotic solvent (for example, N-methyl-2-pyrrolidone or sulfolane) in an amount of 3 to 200 times by weight the weight of the pigment. The system is modified with a sulfonating agent while dispersing the pigment. Sulfonating agents usable herein include, for example, sulfonated pyridine salts, sulfamic acid, amidosulfuric acid, fluorosulfuric acid, chlorosulfuric acid, sulfur trioxide, fuming sulfuric acid, and sulfuric acid. These sulfonating agents may be used alone or in combination of two or more of them. The treatment with the sulfonating agent may be carried out under heating (about 60 to 200° C.) and stirring. The heating may be carried out before or after the addition of the sulfonating agent. After the sulfonation, the aprotic solvent and the residual sulfonating agent are removed from the pigment slurry. For example, washing with water, ultrafiltration, reverse osmosis, centrifugation and/or filtration may be repeated to remove the aprotic solvent and the residual sulfonating agent from the pigment slurry. Subsequently, the sulfonated pigment, together with a wetting agent, is added to an aqueous liquid (particularly ion-exchanged water or distilled water) to a concentration of about 10 to. 40% by weight. Further, if necessary, conventional dispersion is carried out for a short period of time. Thus, an aqueous dispersion of the pigment can be prepared without conducting the step of drying the pigment.

The amount of the dispersibility-imparting groups introduced into the pigment particles contained in the ink according to the present invention is preferably not less than $10 \times 10^{-6}$ equivalent per g of pigment particles. The introduction of the dispersibility-imparting groups in this amount can provide ink compositions which have good storage stability and high print density.

The colored resin particles, which can be added to the ink composition according to the present invention, basically comprise at least a resin component and a colorant, and additives may be properly added to improve the properties of the ink composition.

Resins for constituting colored resin particles include polystyrene, styrene/acrylic ester copolymer, polyacrylic esters, polymethacrylic esters, polyethyl acrylate, styrene/butadiene copolymer, butadiene copolymer, acrylonitrile/butadiene copolymer, chloroprene copolymer, crosslinked acrylic resin, crosslinked styrene resin, vinylidene fluoride, benzoguanamine resin, polyethylene resin, polypropylene resin, styrene/methacrylic ester copolymer, styrene/acrylamide copolymer, n-isobutyl acrylate, vinyl acetate, acrylamide, polyvinyl acetal, rosin resin, vinylidene chloride resin, ethylene/vinyl acetate copolymer, vinyl acetate/acryl copolymer, and vinyl chloride resin.

Colorants for resin particles include oil-soluble dyes, disperse dyes, and pigments. The colorant preferably has an excellent capability of coloring or dyeing the resin and is not dissolved in water as a dispersion medium. Oil-soluble dyes and disperse dyes usable in colored resin particles include:

C.I. Solvent Black 3, 5, and 22;

C.I. Solvent Yellow 19, 44, 98, 104, 105, 112, 113, and 114;

C.I. Solvent Red 8, 24, 71, 109, 152, 155, 176, 177, and 179;

C.I. Solvent Blue 2, 11, 25, 78, 94, and 95;

C.I. Solvent Green 26;

C.I. Solvent Orange 5, 40, 45, 72, 63, 68, and 78;

C.I. Solvent Violet 13, 31, 32, and 33;

C.I. Disperse Yellow 3, 5, 56, 60, 64, and 160;

C.I. Disperse Red 4, 5, 60, 72, 73, and 91;

C.I. Disperse Blue 3, 7, 56, 60, 79, and 198; and C.I. Disperse Orange 13, and 30.

The amount of the colorant added may be properly determined by taking into consideration the kind of the resin, the properties required of the ink and the like. The amount of the colorant added, however, is generally 1 to 20% by weight, preferably 2 to 15% by weight, based on the resin component. The pigment as described above may be used in the colored resin particles in the ink according to the present invention, and the amount of the pigment added is preferably 0.5 to 18% by weight, more preferably 1.0 to 12% by weight, based on the resin.

The specific gravity of the colored resin particles is preferably about 0.95 to 1.2 from the viewpoint of avoiding the sedimentation of these particles in an aqueous solvent and unstable ejection caused by non-homogeneity of the concentration of particles and of providing homogeneous penetration of the solvent.

Water-soluble Organic Solvent, Water and Other Ingredients

The ink composition according to the present invention comprises a water-soluble organic solvent. The water-soluble organic solvent is not particularly limited so far as the solvent is miscible with water and can hold, in a stably dissolved or dispersed state, the colorant contained in the ink composition, the compound represented by formula (I), and various ingredients described below.

Preferred examples of water-soluble organic solvents include glycol ethers having low solubility in water and those which can improve the solubility of other ingredients, improve the penetration into recording media (for example, paper), and prevent nozzle clogging, for example, alkyl alcohols having 1 to 4 carbon atoms, such as ethanol, methanol, butanol, propanol, and isopropanol; glycol ethers, such as ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, diethylene glycol mono-n-propyl ether, ethylene glycol mono-iso-propyl ether, diethylene glycol mono-iso-propyl ether, ethylene glycol mono-n-butyl ether, diethylene glycol mono-n-butyl ether, triethylene glycol mono-n-butyl ether, ethylene glycol mono-t-butyl ether, diethylene glycol mono-t-butyl ether, 1-methyl-1-methoxybutanol, propylene glycol monomethyl ether, propylene glycol monoethyl ether, propylene glycol mono-t-butyl ether, propylene glycol mono-n-propyl ether, propylene glycol mono-iso-propyl ether, dipropylene glycol monomethyl ether, dipropylene glycol monoethyl ether, dipropylene glycol mono-n-propyl ether, dipropylene glycol mono-iso-propyl ether, propylene glycol mono-n-butyl ether, and dipropylene glycol mono-n-butyl ether; formamide; acetamide; dimethyl sulfoxide; sorbit; sorbitan; acetin; diacetin; triacetin; sulfolane; and mixtures of the above water-soluble organic solvents.

Glycols may be added as a water-soluble organic solvent to the ink composition of the prevent invention from the viewpoint of preventing the ink from being dried at the front face of nozzles in a recording head Examples of glycols usable herein include is ethylene glycol, diethylene glycol, triethylene glycol, propylene glycol, dipropylene glycol, tripropylene glycol, polyethylene glycol having a molecular weight of not more than 2000, 1,3-propylene glycol, isopropylene glycol, isobutylene glycol, 1,4-butanediol, 1,3-butanediol, 1,5-pentanediol, 1,6-hexanediol, glycerin, mesoerythritol, and pentaerythritol. Saccharides may also be used for the same purpose. Saccharides usable herein include monosaccharides and polysaccharides. More specific examples thereof include glucose, mannose, fructose, ribose, xylose, arabinose, lactose, galactose, aldonic acid, glucitose, maltose, cellobiose, sucrose, trehalose, maltotriose, alginic acid and salts thereof, cyclodextrins, and celluloses. Although the amount of the saccharide added to the ink composition may be properly determined, the amount of the saccharide added is preferably 0.05 to 30% by weight. In the case of the amount of the saccharide falling within the above range, even though the ink composition is dried at the front end of the head, the nozzle clogging can be easily eliminated and, in addition, the viscosity of the ink composition, which enables stable printing, can be easily realized. According to a preferred embodiment of the present invention, the amount of glucose, mannose, fructose, ribose, xylose, arabinose, lactose, galactose, aldonic acid, glucitose, maltose, cellobiose, sucrose, trehalose, and maltotriose added is more preferably 3 to 20% by weight. The addition- of alginic acid and salts thereof and celluloses is likely to enhance the viscosity of the ink composition, and, hence, the amount of alginic acid added should be carefully determined.

The ink composition of the present invention may further contain a surfactant from the viewpoint of regulating the penetrability or improving the water solubility of the compound represented by formula (I). Preferred surfactants are those having good miscibility with other ingredients in the ink composition, and, among the surfactants, those having high penetrability and good stability are preferred. Preferred examples thereof include amphoteric surfactants and nonionic surfactants.

Examples of preferred amphoteric surfactants usable herein include lauryldimethylaminoacetic acid betaine, 2-alkyl-N-carboxymethyl-N-hydroxyethylimidazolinium betaine, coconut oil fatty acid amide propyldimethylaminoacetic acid betaine, polyoctylpolyaminoethylglycine, and imidazoline derivatives.

Examples of preferred nonionic surfactants usable herein include ether surfactants, such as polyoxyethylene nonylphenyl ether, polyoxyethylene octylphenyl ether, polyoxyethylene dodecylphenyl ether, polyoxyethylene alkylallyl ether, polyoxyethylene oleyl ether, polyoxyethylene lauryl ether, polyoxyethylene alkyl ether, and polyoxyalkylene alkyl ether, polyoxyethyleneoleic acid, ester surfactants, such as polyoxyethyleneoleic ester, polyoxyethylenedistearic ester, sorbitan laurate, sorbitan monoutearate, sorbitan monooleate, sorbitan sesquioleate, polyoxyethylene monooleate, and polyoxyethylene stearate, and fluorosurfactants, such as fluoroalkyl esters and salts of perfluoroalkylcarboxylic acids.

The ink composition according to the present invention may further contain a preservative and antimold. Examples thereof include sodium benzoate, pentachlorophenol sodium, 2-pyridinethiol-1-oxide sodium, sodium sorbate, sodium dehydroacetate, and 1,2-dibenzothiazoline-3-one (Proxel CRL, Proxel BDN, Proxel GXL, Proxel XL-2, and Proxel TN, manufactured by ICI).

If necessary, pH adjustors, solubilizers, and antioxidants may also be added to the ink composition according to the present invention, and examples thereof include: amines, such as diethanolamine, triethanolamine, propanolamine, and morpholine, and modification products thereof; inorganic salts, such as potassium hydroxide, sodium hydroxide, and lithium hydroxide; ammonium hydroxide; quaternary ammonium hydroxide, such as tetramethylammonium; salts of carbonic acid, such as potassium carbonate, sodium carbonate, and lithium carbonate; salts of phosphoric acid, such as potassium phosphate, sodium phosphate, and lithium phosphate; N-methyl-2-pyrrolidone; urea compounds, such as urea, thiourea, and tetramethylurea; allophanate compounds, such as allophanate and methyl allophanate; biuret compounds, such as biuret, dimethylbiuret, and tetramethylbiuret; and L-ascorbic acid and salts thereof. The ink composition according to the present invention may further contain an antioxidant and an ultraviolet absorber.

Ink Jet Recording Method and Apparatus

The ink jet recording method using the ink composition according to the present invention comprises the step of ejecting droplets of an ink composition and depositing the droplets onto a heated recording medium to perform printing, wherein the surface of the heated recording medium has a temperature of or above the cloud point of the compound represented by formula (I). Methods for ejecting droplets of the ink composition include, for example, a method wherein an electric signal is converted to a mechanical signal using an electrostrictive element to intermittently eject an ink reservoired in a nozzle head section, thereby recording letters or symbols on the surface of a recording medium and a method wherein an ink, reservoired in a nozzle head section, in Was portion very close to the ejection portion is rapidly heated to create a bubble and the ink is intermittently ejected by volume expansion created by the bubble to record letters or symbols on the surface of a recording medium. According to a preferred embodiment of the present invention, the ink composition according to the present invention in preferably used in the ink jet recording method using an electrostrictive element. The method involving the heating of the head section has a fear of the temperature being raised to a value above the cloud point of the compound represented by formula (I) contained in the ink. This would make it impossible to stably eject the ink. Therefore, according to a preferred embodiment of the present invention, droplets of the ink composition are preferably ejected by means of a recording head which ejects ink droplets through the utilization of the mechanical function of a piezoelectric element.

An ink jet recording apparatus, which can preferably carry out the ink jet recording method according to the present invention, will be described with reference to the accompanying drawing.

FIG. 1 is a typical view of an ink jet recording apparatus which can preferably utilize the ink composition according to the present invention. In the drawing, a recording head 6 is an ink jet recording head of a type using a piezoelectric element which ejects ink droplets through mechanical function. In the recording head 6, a plurality of nozzles are arranged in a predetermined matrix, and a carriage device 8, which is moved in parallel to a platen 1, is mounted at a position facing the platen 1. A heater 2 is disposed within the platen 1, and temperature sensing means (not shown) senses the surface temperature of recording paper 5. The platen 1 is heated by heater control means (not shown) to heat the recording paper 5. An ink container 7 is connected to the recording head 6, and, on request, ink is supplied from the ink container 7 into the recording head 6. The platen 1 comprises a material pipe of aluminum and a surface layer, formed of silicone rubber or the like, laminated on the circumference of the material pipe. Paper pressing rollers 3 and 4 are in contact with the platen 1. The recording paper 5 is put along the platen 1, and the platen 1 is rotated by a drive (not shown). The ink jet printer is operated as follows. At the outset, an ink is supplied from the ink container 7, and the recording head 6 ejects ink droplets through nozzles according to a print pattern to print an ink image on a recording paper 5 heated by means of the heater 2 contained in the platen 1. The ink composition, upon heating on the recording paper 5, causes rapid penetration of the dispersion medium into the recording paper 5. This results in separation between the colorant and the dispersion medium, and solid matter, such as the colorant, is coagulated and left on the recording paper 5 to yield a print having high quality having neither feathering nor bleeding of the ink from color to color.

EXAMPLES

The present invention will be described in more detail with reference to the following examples, though it is not limited to these examples only.

In the following examples and comparative examples, all amounts added are expressed in terms of solid content (effective ingredient).

Example A1

Preparation of Pigment Dispersion A1

A styrene/acrylic acid copolymer resin (Joncryl 550, weight average molecular weight 7,500, acid value 200) (4 parts by weight), 2.7 parts by weight of triethanolamine, and 0.4 part by weight of isopropyl alcohol were fully dissolved in 72.9 parts by weight of ion-exchanged water with heating at 70° C.

Carbon black MA-100 (manufactured by Mitsubishi Chemical Corporation) (20 parts by weight) was then added to the solution. After premixing, dispersion was carried out by means of Eiger Mill (manufactured by Eiger Japan) to an average particle diameter (secondary particle diameter) of carbon black of 100 nm (percentage beads packing =70%, media diameter =0.7 mm) to prepare a dispersion of 20% by weight of the carbon black.

Preparation of Ink

An ink composition was prepared according to the following formulation.

|  | Amount added (wt %) |
| --- | --- |
| Pigment dispersion A1 | 5.0 |
| Material a1 | 3.0 |
| Material b1 | 2.0 |
| Glycerin | 12.0 |
| Triethanolamine | 0.8 |
| Ion-exchanged water | Balance |

In the above ingredients, the material a1 is a mixture (cloud point: 60° C.) of compounds, represented by formula (I) wherein k=18 and m/n=1, with an average molecular weight of 3,000, and the material B1 is a mixture (cloud point: 50° C.) of compounds represented by formula (I) wherein k=6, m=4, and n=2.

The above ingredients were mixed together, and the mixture was passed through a metallic mesh filter (manufactured by Manabe Kogyo Co., Ltd., twill woven filter=2,300 mesh) to prepare an ink composition.

Example A2

Preparation of Pigment Dispersion A2

A styrene/acrylic acid copolymer resin (Joncryl 550, weight average molecular weight 7,500, acid value 200) (4 parts by weight), 2.7 parts by weight of triethanolamine, and 0.4 part by weight of isopropyl alcohol were fully dissolved in 72.9 parts by weight of ion-exchanged water with heating at 70° C.

A phthalocyaninepigment (C.I. Pigment Blue 15:3) (20 parts by weight) was then added to the solution. After premixing, dispersion was carried out by means of Eiger Mill (manufactured by Eiger Japan) to an average particle diameter of pigment of 110 nm (percentage beads packing= 70%, media diameter=0.7 mm) to prepare a dispersion of 20% by weight of the cyan organic pigment.

Preparation of Ink

An ink composition was prepared according to the following formulation.

|  | Amount added (wt %) |
| --- | --- |
| Pigment dispersion A2 | 5.0 |
| Material a2 | 2.0 |
| Material b2 | 5.0 |
| Maltose | 10.0 |
| Triethanolamine | 0.8 |
| Ion-exchanged water | Balance |

In the above ingredients, the material a2 is a mixture (cloud point: 70° C.) of compounds, represented by formula (I) wherein k=18 and m/n=1.25, with an average molecular weight of 7,200, and the material b2 is a mixture (cloud point; 30° C.) of compounds, represented by formula (I) wherein k=4, m=1.5, and n=1.

The above ingredients were mixed together, and the mixture was passed through a metallic mesh filter (manufactured by Manabe Kogyo Co., Ltd., twill woven filter=2,300 mesh) to prepare an ink composition. Although the material b2 had low solubility in water at room temperature, this material could be dissolved in water in the presence of the material a2.

Example A3

Preparation of Pigment Dispersion A3

Carbon Black (MA-7, manufactured by Mitsubishi Chemical Corporation) (12 parts by weight) was mixed with 600 parts by weight of a 5% sodium hypochlorite solution. The mixture was heated under reflux at 80 to 95° C. for 10 hr. The system was then washed with water and centrifuged. The washing with water and the centrifugation were repeated, and the system was then adjusted to pH 1 by the addition of hydrochloric acid, followed by desaltation through a reverse osmosis membrane. Triethanolamine was added to the mixture to adjust the pH value to 8. Thus, a dispersion of 15% of surface modified carbon black (average particle diameter 120 nm) was prepared.

Preparation of Ink

An ink composition was prepared according to the following formulation.

| | Amount added (wt %) |
|---|---|
| Pigment dispersion A3 | 5.0 |
| Material a3 | 3.0 |
| Material b3 | 2.0 |
| Glycerin | 12.0 |
| Triethanolamine | 0.8 |
| Ion-exchanged water | Balance |

In the above ingredients, the material a3 is a mixture (cloud point: 58° C.) of compounds, represented by formula (I) wherein k=B and m/n=1, with an average molecular weight of 4,000, and the material b3 is a mixture (cloud point: 35° C.) of compounds, represented by formula (I) wherein k=6, m=3, and n=2.

The above ingredients were mixed together, and the mixture was passed through a metallic mesh filter (manufactured by Manabe Kogyo Co., Ltd., twill woven filter=2,300 mesh) to prepare an ink composition.

Example A4

Preparation of Pigment Dispersion A4

A phthalocyanine pigment (C. I. Pigment Blue 15:3) (3 parts by weight) was added to 100 parts by weight of fuming sulfuric acid (SO, concentration: 25%) of 5 to 10° C. with stirring over a period of 15 min. The mixture thus obtained was stirred at 70 to 90° C. for several hr, and then poured into ice water. The resultant suspension was filtered and washed, followed by the addition of triethanolamine to adjust pH to 8.2. Thus, a dispersion of 18% by weight of a surface modified phthalocyanine pigment (average particle diameter 150 nm) was prepared.

Preparation of Ink

An ink composition was prepared according to the following formulation.

| | Amount added (wt %) |
|---|---|
| Pigment dispersion A4 | 5.0 |
| Material a4 | 4.0 |
| Material b4 | 2.0 |
| Glycerin | 5.0 |
| Diethylene glycol | 6.0 |
| Triethanolamine | 0.8 |
| Ion-exchanged water | Balance |

In the above ingredients, the material a4 is a mixture (cloud point: 65° C.) of compounds, represented by formula (I) wherein k=16 and m/n 1, with an average molecular weight of 2,500, and the material b4 is a mixture (cloud point: 46° C.) of compounds, represented by formula (I) wherein k=8, m=6, and n=4.

The above ingredients were mixed together, and the mixture was passed through a metallic mesh filter (manufactured by Manabe Kogyo Co., Ltd., twill woven filter=2,300 mesh) to prepare an ink composition.

Example A5

Preparation of Dispersion A5 of Colored Resin Particles

A monomer as a resin component (methyl acrylate or methyl methacrylate) was emulsion polymerized in water to prepare polymer particles having an average diameter of 0.1 to 0.4 μm. Thereafter, coarse particles, the monomer remaining unreacted, and semi-dissolved particles were removed from the polymer particles to prepare an aqueous resin emulsion consisting of polymer particles having an average diameter of 0.3 μm. Polymer particles in the emulsion was then colored with an oil dye to prepare the contemplated dispersion of colored resin particles (content of effective ingredient 10% by weight).

Preparation of Ink

An ink composition was prepared according to the following formulation.

| | Amount added (wt %) |
|---|---|
| Dispersion A5 of colored resin | 5.0 |
| Material a5 | 10.0 |
| Material b5 | 0.5 |
| Ethylene glycol | 10.0 |
| Monoethanolamine | 0.8 |
| Ion-exchanged water | Balance |

In the above ingredients, the material a5 is a mixture (cloud point: 40° C.) of compounds, represented by formula (I) wherein k=6 and m/n=0.8, with an average molecular weight of 1,200, and the material b5 is a mixture (cloud point: 80° C.) of compounds, represented by formula (I) wherein k=10, m=9, and n=1.

The above ingredients were mixed together, and the mixture was passed through a metallic mesh filter (manufactured by Manabe Kogyo Co., Ltd., twill woven filter=2,300 mesh) to prepare an ink composition.

Example A6

The pigment dispersion A2 prepared in Example A2 was provided as the colorant, and the material al (cloud point: 60° C.) and the material b1 (cloud point: 500) as used in Example A1 were provided as the compounds represented by formula (I).

| | Amount added (wt %) |
|---|---|
| Pigment dispersion A2 | 5.0 |
| Material a1 | 3.0 |
| Material b1 | 2.0 |
| Glycerin | 12.0 |
| Triethanolamine | 0.8 |
| Ion-exchanged water | Balance |

The above ingredients were mixed together, and the mixture was passed through a metallic mesh filter (manufactured by Manabe Kogyo Co., Ltd., twill woven filter=2,300 mesh) to prepare an ink composition.

Example A7

The pigment dispersion A4 prepared in Example A4 was provided as the colorant, and the material a3 (cloud point: 58C) and the material b3 (cloud point: 35° C.) as used in Example A3 were provided as the compounds represented by formula (I).

| | Amount added (wt %) |
|---|---|
| Pigment dispersion A4 | 5.0 |
| Material a3 | 3.0 |
| Material b3 | 2.0 |
| Glycerin | 12.0 |
| Triethanolamine | 0.8 |
| Ion-exchanged water | Balance |

The above ingredients were mixed together, and the mixture was passed through a metallic mesh filter (manufactured by Manabe Kogyo Co., Ltd., twill woven filter=2,300 mesh) to prepare an ink composition.

Evaluation Test on Properties of Ink Composition

An ink jet printer having a basic structure shown in FIG. 1 was used to evaluate the properties of ink compositions of Examples A1 to A7 by the following methods.

1. Edge Sharpness of Printed Image

Printing was carried out on several types of plain papers, and print samples were evaluated for feathering of edge portions according to the following criteria. The surface temperature of the recording medium was 60° C.

- A: Substantially all the print patterns were free from feathering and had high edge sharpness, independently of paper types.
- B: Some print patterns suffered from somewhat poor edge sharpness on such a level that does not pose a practical problem, the difference in edge sharpness among paper types being small.
- C: For all the paper types or a part of the paper types, the print pattern suffered from poor edge sharpness, and the printed image was blurred on such a level that rendered the printed image unsuitable for practical use.

The results were as summarized in the following table.

| Edge sharpness | | | | | | | |
|---|---|---|---|---|---|---|---|
| Example A | 1 | 2 | 3 | 4 | 5 | 6 | 7 |
| Results | B | B | A | A | B | A | A |

2. Rapidity in Drying

Printing was carried out on several types of plain papers, and print samples were evaluated for rapidity in drying according to the following criteria. The surface temperature of the recording medium was 60° C.

- A: Touch with a finger 5 sec after printing did not cause smudge in the print.
- B: Touch with a finger 5 sec after printing caused smudge in the print.

The results were as summarized in the following table.

| Rapidity in drying | | | | | | | |
|---|---|---|---|---|---|---|---|
| Example A | 1 | 2 | 3 | 4 | 5 | 6 | 7 |
| Results | A | A | A | A | A | A | A |

3. Bleeding of Color Into Adjacent Colors in Multi-Color Printing

Ink compositions were used in combinations as indicated in the following table to perform multicolor printing, and the prints were evaluated for bleeding at boundary areas between contiguously printed color inks according to the following criteria. The surface temperature of the recording medium was 60° C.

- A: Color-to-color bleeding was not observed between contiguous colors, and the boundary areas between contiguous colors were sharp.
- B: Color-to-color bleeding was observed between contiguous colors, and the boundary areas between contiguous colors were blurred.

The results were as summarized in the following table.

| Bleeding | | |
|---|---|---|
| Example A | 1 and 6 | 3 and 7 |
| Results | A | A |

4. Storage Stability

The ink composition was placed in a sample bottle made of glass, and the bottle was then allowed to stand at 50° C. for one week. At the end of this storage period, the ink was inspected for the presence of sediments. The ink (2 cc) after the standing was passed through a filter having a diameter of 1 mm and a pore diameter of 10 $\mu$m, and the number of residues on the filter was determined by observation under a microscope (at a magnification of 50 times) to evaluate the storage stability based on the following criteria.

- A: Not more than 200 residues on the filter
- B: More than 200 to less than 500 residues on the filter
- C: Not less than 500 residues on the filter

| Storage stability | | | | | | | |
|---|---|---|---|---|---|---|---|
| Example A | 1 | 2 | 3 | 4 | 5 | 6 | 7 |
| Results | A | B | A | A | B | A | A |

Example B1

Preparation of Pigment Dispersion B1

Carbon black (MA-7, manufactured by Mitsubishi Chemical Corporation) (15 parts by weight) was mixed into 200 parts by weight of sulfolane. Dispersion was carried out by means of Eiger Motor Mill (model M250, manufactured by Eiger Japan) under conditions of percentage beads packing 70% and rotation speed 5,000 rpm for one hr. The pigment paste thus obtained was transferred to an evaporator, and heated to 120° C. while reducing the pressure to not more than 30 mmHg to distill away water contained in the system as much as possible. Thereafter, the temperature of the system was regulated to 150° C., 25 parts by weight of sulfur trioxide was added thereto, and a reaction was allowed to proceed for 6 hr. After the completion of the reaction, the reaction product was washed several times with an excess of sulfolane, and then poured into water, followed by filtration. Adjusting pH of the dispersion to 8.5 with a sodium hydroxide solution provided a dispersion of 15% by weight of a surface modified carbon black (average particle diameter: 110 nm).

Preparation of Ink

An ink composition was prepared according to the following formulation.

| | Amount added (wt %) |
|---|---|
| Pigment dispersion B1 | 5.0 |
| Material α1 | 3.0 |
| Material β1 | 2.0 |
| Glycerin | 12.0 |
| Triethanolamine | 0.8 |
| Ion-exchanged water | Balance |

In the above ingredients, the material α1 is a mixture (cloud point; 60° C.) of compounds, represented by formula (I) wherein k=16 and m/n=1, with an average molecular weight of 3,500, and the material β1 is a compound (cloud point: 40° C.) represented by formula (I) wherein k=4, m=2, and n=1.

The above ingredients were mixed together, and the mixture was passed through a metallic mesh filter (manufactured by Manabe Kogyo Co., Ltd., twill woven filter=2,300 mesh) to prepare an ink composition.

Example B2
Preparation of Pigment Dispersion B2

A styrene/acrylic acid copolymer resin (Joncryl 550, weight average molecular weight 7,500, acid value 200) (4 parts by weight), 2.7 parts by weight of triethanolamine, and 0.4 part by weight of isopropyl alcohol were fully dissolved in 72.9 parts by weight of ion-exchanged water with heating at 70° C.

Carbon Black MA-100 (manufactured by Mitsubishi Chemical Corporation) (20 parts by weight) was then added to the solution. After premixing, dispersion was carried out by means of Eiger Mill (manufactured by Eiger Japan) to an average particle diameter (secondary particle diameter) of the carbon black of 100 nm (percentage beads packing= 70%, media diameter=0.7 mm) to prepare a dispersion of 20% by weight of the carbon black pigment.

Preparation of Ink

An ink composition was prepared according to the following formulation.

|  | Amount added (wt %) |
|---|---|
| Pigment dispersion B2 | 5.0 |
| Material α2 | 2.0 |
| Material β2 | 5.0 |
| Maltose | 10.0 |
| Ion-exchanged water | Balance |

In the above ingredients, the material α2 is a mixture (cloud point: 65° C.) of compounds, represented by formula (I) wherein k=16 and m/n=1.2, with an average molecular weight of 6,000, and the material β2 is a mixture (cloud point: 55° C.) of compounds represented by formula (I) wherein k=5, m=3, and n=1.

The above ingredients were mixed together, and the mixture was passed through a metallic mesh filter (manufactured by Manabe Kogyo Co., Ltd., twill woven filter=2,300 mesh) to prepare an ink composition.

Example B3
Preparation of Pigment Dispersion B3

A phthalocyanine pigment (C.I. Pigment Blue 15:3) (20 parts by weight) was mixed with 500 parts by weight of quinoline. Dispersion was carried out by means of Eiger Motor Mill (model M250, manufactured by Eiger Japan) under conditions of percentage beads packing 70% and rotation speed 5,000 rpm for 2 hr. The pigment paste thus obtained was transferred to an evaporator, and heated to 120° C. while reducing the pressure to not more than 30 =mmHg to distill away water contained in the system as much as possible. Thereafter, the temperature of the system was regulated to 160° C., 20 parts by weight of a sulfonated pyridine complex was added thereto, and a reaction was allowed to proceed for 8 hr. After the completion of the reaction, the reaction product was washed several times with an excess of quinoline, and then poured into water, followed by filtration. Adjusting pH of the dispersion to 7.0 with a triethanol amine solution provided a dispersion of 20% by weight of a surface modified phthalocyanine pigment (average particle diameter: 120nm).

Preparation of Ink

An ink composition was prepared according to the following formulation.

|  | Amount added (wt %) |
|---|---|
| Pigment dispersion B3 | 5.0 |
| Material α3 | 9.0 |
| Material β3 | 1.0 |
| Glycerin | 10.0 |
| Sodium hydroxide | 0.8 |
| Ion-exchanged water | Balance |

In the above ingredients, the material α3 is a mixture (cloud point: 54° C.) of compounds, represented by formula (I) wherein k=18 and m/n=1, with an average molecular weight of 3,200, and the material β3 is a mixture (cloud point:. 50° C.) of compounds represented by formula (I) wherein k=6, m=4, and n=2.

The above ingredients were mixed together, and the mixture was passed through a metallic mesh filter (manufactured by Manabe Kogyo Co., Ltd., twill woven filter=2,300 mesh) to prepare an ink composition.

Example B4
Preparation of Pigment Dispersion B4

An isoindolinone pigment (C.I. Pigment Yellow 110) (20 parts by weight) was mixed with 500 parts by weight of quinoline. Dispersion was carried out by means of Eiger Motor Mill (model M250, manufactured by Eiger Japan) under conditions of percentage beads packing 70% and rotation speed 5,000 rpm for 2 hr. The pigment paste thus obtained was transferred to an evaporator, and heated to 120° C. while reducing the pressure to not more than 30 mmHg to distill away water contained in the system as much as possible. Thereafter, the temperature of the system was regulated to 160° C., 20 parts by weight of a sulfonated pyridine complex as a reactant was added thereto, and a reaction was allowed to proceed for 4 hr. After the completion of the reaction, the reaction product was washed several times with an excess of quinoline, and then poured into water, followed by filtration. Adjusting pH of the dispersion to 8.0 with a sodium hydroxide solution provided a dispersion of 20% by weight of a surface modified isoindolinone pigment (average particle diameter. 120 nm).

Preparation of Ink

An ink composition was prepared according to the following formulation.

|  | Amount added (wt %) |
|---|---|
| Pigment dispersion B4 | 5.0 |
| Material α4 | 3.0 |
| Material β1 | 2.0 |
| Glycerin | 12.0 |
| Monoethanolamine | 0.8 |
| Ion-exchanged water | Balance |

In the above ingredients, the material α4 is a mixture (cloud point: 56° C.) of compounds, represented by formula (I) wherein k=18 and m/n=0.9, with an average molecular weight of 2,500, and the material β1 is the same material β1 (cloud point: 40° C.), which is a compound represented by formula (I), as used in Example B1.

The above ingredients were mixed together, and the mixture was passed through a metallic mesh filter (manufactured by Manabe Kogyo Co., Ltd., twill woven filter=2,300 mesh) to prepare an ink composition.

Example B5

Preparation of Pigment Dispersion B5

A pigment dispersion was prepared in the same manner as in Example B4, except that, in the preparation of the dispersion B4 in Example B4, a dimethylquinacridone pigment (C.I. Pigment Red 122) was used instead of the isoindolinone pigment (average particle diameter. 110 nm).

Preparation of Ink

An ink composition was prepared according to the following formulation.

|  | Amount added (wt %) |
| --- | --- |
| Pigment dispersion B5 | 5.0 |
| Material α1 | 3.0 |
| Material β3 | 3.0 |
| Glycerin | 12.0 |
| Triethanolamine | 0.8 |
| Ion-exchanged water | Balance |

The material α1 is the same material a 1 (cloud point: 60° C.), which is a compound represented by formula (I), as used in Example B1.

The above ingredients were mixed together, and the mixture was passed through a metallic mesh filter (manufactured by Manabe Kogyo Co. Ltd., twill woven filter=2,300 mesh) to prepare an ink composition.

Example B6

Preparation of Pigment Dispersion B6

A pigment dispersion B6 of a surface modified carbon black was prepared in the same manner as used in the preparation of the pigment dispersion B1 of Example B1, except that Printex 150T (manufactured by Degussa) was used as the carbon black (average particle diameter: 120nm).

Preparation of Ink

An ink composition was prepared according to the following formulation.

|  | Amount added (wt %) |
| --- | --- |
| Pigment dispersion B6 | 5.0 |
| Material α1 | 10.0 |
| Glycerin | 12.0 |
| Triethanolamine | 0.8 |
| Ion-exchanged water | Balance |

The above ingredients were mixed together, and the mixture was passed through a metallic mesh filter (manufactured by Manabe Kogyo Co., Ltd., twill woven filter=2,300 mesh) to prepare an ink composition.

Example B7

The pigment dispersion B6 prepared in Example B6 was provided as the colorant, and the material β1 (cloud point: 40° C.) as used in Example B1 was provided as the compounds represented by formula (I).

|  | Amount added (wt %) |
| --- | --- |
| Pigment dispersion B6 | 5.0 |
| Material β1 | 5.0 |
| Glycerin | 12.0 |
| Triethanolamine | 0.8 |
| Ion-exchanged water | Balance |

The above ingredients were mixed together, and the mixture was passed through a metallic mesh filter (manufactured by Manabe Kogyo Co., Ltd., twill woven filter=2,300 mesh) to prepare an ink composition.

Example B8 (comparative example)

The pigment dispersion B6 prepared in Example B6 was provided as the colorant.

|  | Amount added (wt %) |
| --- | --- |
| Pigment dispersion B2 | 5.0 |
| Glycerin | 15.0 |
| Triethanolamine | 0.8 |
| Ion-exchanged water | Balance |

This ink composition was free from the compounds represented by formula (I). The above ingredients were mixed together, and the mixture was passed through a metallic mesh filter (manufactured by Manabe Kogyo Co., Ltd., twill woven filter=2,300 mesh) to prepare the ink composition.

Example B9

The pigment dispersion B2 prepared in Example B2 was provided as the colorant, and the material α1 (cloud point: 60° C.) and the material β1 (cloud point: 40° C.) as used in Example B1 were provided as the compounds represented by formula (I).

|  | Amount added (wt %) |
| --- | --- |
| Pigment dispersion B2 | 5.0 |
| Material α1 | 3.0 |
| Material β1 | 3.0 |
| Glycerin | 12.0 |
| Triethanolamine | 0.8 |
| Ion-exchanged water | Balance |

The above ingredients were mixed together, and the mixture was passed through a metallic mesh filter (manufactured by Manabe Kogyo Co., Ltd., twill woven filter 2,300 mesh) to prepare an ink composition.

Evaluation Test on Properties of Ink Composition

An ink jet printer having a basic structure shown in FIG. 1 was used to evaluate the properties of ink compositions of Examples B1 to B9 by the following methods.

1. Edge Sharpness of Printed Images

Printed images formed in the same manner as in Example A were evaluated for the sharpness of the edge of printed images. The heating temperature was 60° C. for the ink compositions prepared in Examples B1 to B8, and 35° C. for the ink composition prepared in Example B9.

The results were evaluated according to the same evaluation criteria as described in Example A.

The results of evaluation were as summarized in the following table.

| | | | | Edge sharpness | | | | | |
|---|---|---|---|---|---|---|---|---|---|
| Example B | 1 | 2 | 3 | 4 | 5 | 6 | 7 | 8 | 9 |
| Results | A | B | A | A | A | A | B | C | C |

2. Rapidity in Drying

Printed images formed in the same manner as in Example A were evaluated for rapidity in drying. The heating temperature was 60° C. for the ink compositions prepared in Examples B1 to B8, and 35° C. for the ink composition prepared in Example B9.

The results were evaluated according to the same evaluation criteria as described in Example A.

The results of evaluation were as summarized in the following table.

| | | | | Rapidity in drying | | | | | |
|---|---|---|---|---|---|---|---|---|---|
| Example B | 1 | 2 | 3 | 4 | 5 | 6 | 7 | 8 | 9 |
| Results | A | A | A | A | A | B | A | C | C |

3. Blending of Color Into Adjacent Colors in Multi-Color Printing

The cyan ink prepared in Example B3, the yellow ink prepared in Example B4, and the magenta ink prepared in Example B5 were used in combination with the black inks prepared in Examples B1, B2, B6, B7, B8, and B9 to perform multi-color printing. The heating temperature was 60° C. for all the inks except for the black ink prepared in Example B9, and 35° C. for the black ink prepared in Example B9.

Bleeding at boundary areas between the black ink and other color ink was evaluated according to the following criteria.

A: Color-to-color bleeding was not observed between contiguous colors, and the boundary areas between contiguous colors were sharp, providing good print quality.

B: Color-to-color bleeding was observed between contiguous colors, and the boundary areas between contiguous colors were blurred, although this unfavorable phenomenon was not on a level causing a practical problem.

C: Color-to-color bleeding was observed between contiguous colors, and the boundary areas between contiguous colors were significantly blurred to such an extent that letters and the like were illegible, posing a practical problem.

The results were as summarized in the following table.

| Bleeding Black ink used in combination with other color inks | | | | | | |
|---|---|---|---|---|---|---|
| Example B | 1 | 2 | 6 | 7 | 8 | 9 |
| Results | A | A | B | A | C | C |

4. Storage Stability

A storage stability test was carried out in the same manner as in Example A. The results were evaluated according to the same criteria as described in Example A.

The results were as summarized in the following table.

| | | | | Storage stability | | | | | |
|---|---|---|---|---|---|---|---|---|---|
| Example B | 1 | 2 | 3 | 4 | 5 | 6 | 7 | 8 | 9 |
| Results | A | B | A | A | A | A | B | B | B |

5. Ejection Stability

In the evaluation tests 1 to 4, inspection was made for dropouts, droplet trajectory directionality problem and the like. The results were evaluated according to the following criteria.

A: Dropouts and droplet trajectory directionality problem hardly occurred, and the ejection was good throughout the printing tests.

B: Dropouts and droplet trajectory directionality problem sometimes occurred, and the ejection was unstable yielding disturbed printed images.

The results were as summarized in the following table.

| | | | | Ejection stability | | | | | |
|---|---|---|---|---|---|---|---|---|---|
| Example B | 1 | 2 | 3 | 4 | 5 | 6 | 7 | 8 | 9 |
| Results | A | A | A | A | A | A | B | A | A |

What is claimed is:

1. An ink composition for an ink jet recording method comprising the step of ejecting droplets of an ink composition and depositing the droplets onto a heated recording medium, the ink composition comprising a water-soluble organic solvent, water, a colorant present in a state of dispersion in the ink composition, and a plurality of components represented by formula (I):

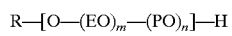

R—[O—(EO)$_m$—(PO)$_n$]—H wherein
EO represents an ethyleneoxy group;
PO represents a propyleneoxy group;
m and n are each an integer; and
R represents $C_kH_{2k+1}$ wherein k is a natural number of 4 to 18,
EO and PO being arranged, regardless of order in the parentheses, randomly or as blocks joined together, wherein the
plurality of the compounds represented by formula (I) are classified into a first group of compounds and a second group of compounds, the first group of compounds satisfying a relationship wherein k=6 to 18 and 2/3≦m/n≦1.5, and having an average molecular weight of 1,000 to 8,000, the second group of compounds satisfying a relationship wherein k=4 to 10, m=1 to 10, n=1 to 5, and 1.5≦m/n.

2. The ink composition according to claim 1, wherein the content of the first group of compounds is 2 to 10% by weight based on the ink composition.

3. The ink composition according to claims 1, wherein the content of the second group of compounds is 0.5 to 5% by weight based on the ink composition.

4. The ink composition according to claim 1, wherein the cloud point of at least one of the first group of compounds and the second group of compounds is room temperature to 100° C.

5. The ink composition according to claim 1, wherein the cloud point of at least one of the first group of compounds and the second group of compounds is 40 to 70° C.

6. The ink composition according to claim 1, wherein the colorant is a pigment.

7. The ink composition according to claim 1, wherein the colorant is a colored particulate resin.

8. The ink composition according to claim 6, wherein the colorant is a surface-modified pigment which has functional groups introduced on its surface and can be solely dispersed in an aqueous solvent.

9. The ink composition according to claim 8, wherein the colorant is a surface-modified carbon black which has functional groups introduced on its surface and can be solely dispersed in an aqueous solvent.

10. The ink composition according to claim 8, wherein the colorant is a surface-modified organic pigment which has functional groups introduced on its surface and can be solely dispersed in an aqueous solvent.

11. The ink composition according to claim 9 or 10, wherein the functional groups introduced are sulfur-containing functional groups.

12. The ink composition according to claim 9 or 10, wherein the functional groups introduced are sulfur-containing functional groups and the sulfur-containing functional groups are $SO_2—$ or $SO_3—$.

13. An ink jet recording method comprising the step of:

ejecting droplets of an ink composition and depositing the droplets onto a recording medium, and heating the recording medium before or after the ink is deposited thereon, wherein the ink composition comprises a water-soluble organic solvent, water, a colorant, and at least one compound represented by formula (I):

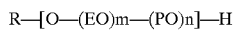

H where EO represents an ethyleneoxy group;

PO represents a propyleneoxy group;

m and n are each an integer; and R represents $C_kH_{2k+1}$ wherein k is a natural number of 4 to 18, EO and PO are arranged, regardless of order in the parentheses, randomly or as blocks joined together, wherein the plurality of the compounds represented by formula (I) are classified into a first group of compounds and a second group of compounds, the first group of compounds satisfying a relationship wherein the k=6 to 18 and ⅔≦m/n≦1.5, and having an average molecular weight of 1,000 to 8,000, the second group of compounds satisfying a relationship wherein k=4 to 10, m=1 to 10, n=1 to 5, and 1.5≦m/n, the colorant is present in the state of dispersion in the ink composition, and the surface of the heated recording medium has a temperature of or above the cloud point of the compound represented by formula (I).

14. The method according to claim 13, wherein the content of the first group of compounds is 2 to 10% by weight based on the ink composition.

15. The method according to claim 13, wherein the content of the second group of compounds is 0.5 to 5% by weight based on the ink composition.

16. The method according to claim 13, wherein the cloud point of at least one of the first group of compounds and the second group of compounds is room temperature to 100.

17. The ink composition according to claim 13, wherein the cloud point of at least one of the first group of compounds and the second group of compounds is 40 to 70.

18. The method according to claim 13, wherein the colorant is a pigment.

19. The method according to claim 13, wherein the colorant is a colored particulate resin.

20. The method according to claim 18, wherein the colorant is a surface-modified pigment which has functional groups introduced on its surface and can be solely dispersed in an aqueous solvent.

21. The method according to claim 20, wherein the colorant is a surface-modified carbon black which has functional groups introduced on its surface and can be solely dispersed in an aqueous solvent.

22. The method according to claim 20, wherein the colorant is a surface-modified organic pigment which has functional groups introduced on its surface and can be solely dispersed in an aqueous solvent.

23. The method according to claim 21, wherein the functional groups are sulfur-containing functional groups.

24. The method according to claim 23, wherein the sulfur-containing functional groups are $SO_2^-$ or $SO_3^-$.

25. The method according to claim 24, wherein the colorant is an organic pigment.

26. The method according to claim 22, wherein the functional groups are sulfur-containing functional groups.

27. The method according to claim 26, wherein the sulfur-containing functional groups are $SO_2^-$ or $SO_3^-$.

28. The method according to claim 27, wherein the colorant is an organic pigment.

29. The ink jet recording method according to claim 13, wherein the droplets of the ink composition are ejected by means of a recording head which ejects ink droplets utilizing the mechanical action of a piezoelectric element.

30. A record produced by the recording method according to claim 13.

* * * * *